(12) United States Patent
Svensson et al.

(10) Patent No.: US 12,052,947 B2
(45) Date of Patent: Aug. 6, 2024

(54) LAWN MOWER PROVIDED WITH A DIVIDER PLATE DIVIDING AN ENCLOSED SPACE INTO AN UPPER SPACE AND A CUTTING SPACE

(71) Applicant: Husqvarna AB, Huskvarna (SE)

(72) Inventors: Mats Svensson, Huskvarna (SE); Anders Hjalmarsson, Gränna (SE); Jonas Agerhall, Taberg (SE)

(73) Assignee: HUSQVARNA AB, Huskvarna (SE)

( * ) Notice: Subject to any disclaimer, the term of this patent is extended or adjusted under 35 U.S.C. 154(b) by 90 days.

(21) Appl. No.: 17/923,378

(22) PCT Filed: Jun. 12, 2020

(86) PCT No.: PCT/SE2020/050608
§ 371 (c)(1),
(2) Date: Nov. 4, 2022

(87) PCT Pub. No.: WO2021/225487
PCT Pub. Date: Nov. 11, 2021

(65) Prior Publication Data
US 2023/0189705 A1 Jun. 22, 2023

(30) Foreign Application Priority Data

May 8, 2020 (SE) .................................. 2050539-2
May 28, 2020 (SE) .................................. 2050612-7

(51) Int. Cl.
*A01D 34/68* (2006.01)
*A01D 34/81* (2006.01)
(Continued)

(52) U.S. Cl.
CPC ............ *A01D 34/81* (2013.01); *A01D 34/008* (2013.01); *A01D 34/66* (2013.01); *A01D 2101/00* (2013.01)

(58) Field of Classification Search
CPC .. A01D 2101/00; A01D 34/008; A01D 34/68; A01D 34/00; A01D 34/76; A01D 34/4167; A01D 34/47
See application file for complete search history.

(56) References Cited

U.S. PATENT DOCUMENTS 4,189,903 A 2/1980 Jackson et al.
4,232,505 A 11/1980 Walto
(Continued)

FOREIGN PATENT DOCUMENTS

CN 103941735 A 7/2014
CN 205946577 U 2/2017
(Continued)

OTHER PUBLICATIONS

Office Action and Search Report for Swedish Application No. 2050539-2 mailed on Dec. 15, 2020.
(Continued)

*Primary Examiner* — Dalena Tran
(74) *Attorney, Agent, or Firm* — Burr & Forman LLP

(57) ABSTRACT

The present disclosure relates to a lawnmower for processing lawn surface. The lawn mower comprises a chassis, at least partially carried by a set of wheels adapted to rest on the lawn surface, and one or more cutting devices suspended by the chassis. An outer cover, enclosing the chassis and is open towards the lawn surface to form an enclosed space between the outer cover and the lawn surface. A divider plate divides the enclosed space into an upper space and a cutting space, the divider plate generally extending along a plane that is approximately parallel with the lawn surface. The cutting device projects through an opening in the divider plate and edges of the divider plate are connected to the outer cover.

12 Claims, 4 Drawing Sheets

(51) Int. Cl.
  *A01D 34/00* (2006.01)
  *A01D 34/66* (2006.01)
  *A01D 101/00* (2006.01)

(56) References Cited

U.S. PATENT DOCUMENTS

| | | | |
|---|---|---|---|
| 5,211,722 | A | 5/1993 | Wagner |
| 5,212,938 | A | 5/1993 | Zenner et al. |
| 5,638,668 | A | 6/1997 | Kallevig et al. |
| 6,615,108 | B1 | 9/2003 | Peless et al. |
| 7,047,132 | B2 | 5/2006 | Jacobs |
| 2004/0165968 | A1 | 8/2004 | Logiudice |
| 2004/0202512 | A1 | 10/2004 | Smith |
| 2005/0251292 | A1 | 11/2005 | Casey et al. |
| 2006/0293794 | A1 | 12/2006 | Harwig et al. |
| 2007/0016328 | A1 | 1/2007 | Ziegler et al. |
| 2012/0023887 | A1 | 2/2012 | Messina et al. |
| 2015/0166060 | A1 | 6/2015 | Smith |
| 2015/0181805 | A1 | 7/2015 | Elonsson |
| 2016/0174459 | A1* | 6/2016 | Balutis ............... G05D 1/0234 701/25 |
| 2016/0302354 | A1* | 10/2016 | Franzius ............ A01D 34/008 |
| 2018/0169863 | A1 | 6/2018 | Bushman et al. |
| 2018/0235146 | A1 | 8/2018 | Hashimoto et al. |
| 2019/0265724 | A1 | 8/2019 | Sheng et al. |
| 2019/0307063 | A1 | 10/2019 | Hong et al. |
| 2021/0045277 | A1* | 2/2021 | Martin ................ A01B 63/104 |
| 2022/0193854 | A1* | 6/2022 | Smith ..................... B24B 3/365 |
| 2023/0052257 | A1* | 2/2023 | Choi ........................ B25J 19/02 |

FOREIGN PATENT DOCUMENTS

| | | |
|---|---|---|
| CN | 208027167 A | 10/2018 |
| CN | 209417594 | 9/2019 |
| EP | 0531071 A1 | 3/1993 |
| EP | 3508048 A1 | 7/2019 |
| GB | 2289848 A | 12/1995 |
| JP | 0585205 U | 11/1993 |
| JP | 0787823 A | 4/1995 |
| JP | 2001078530 A | 3/2001 |
| JP | 2016195546 A | 11/2016 |
| KR | 20080027675 A | 3/2008 |
| WO | 03013223 A1 | 2/2003 |
| WO | 2006064345 A2 | 6/2006 |
| WO | 2007083459 A1 | 7/2007 |
| WO | 2014007729 A1 | 1/2014 |
| WO | 2019157841 A1 | 8/2019 |
| WO | 2020171753 A1 | 8/2020 |

OTHER PUBLICATIONS

International Search Report and Written Opinion in International Application No. PCT/SE2020/050608 mailed Dec. 16, 2020.

Office Action and Search Report for Swedish Application No. 2050612-7 mailed on Feb. 3, 2021.

Office Action and Search Report for Swedish Application No. 1950230-1 mailed on Sep. 11, 2019.

* cited by examiner

Fig 4
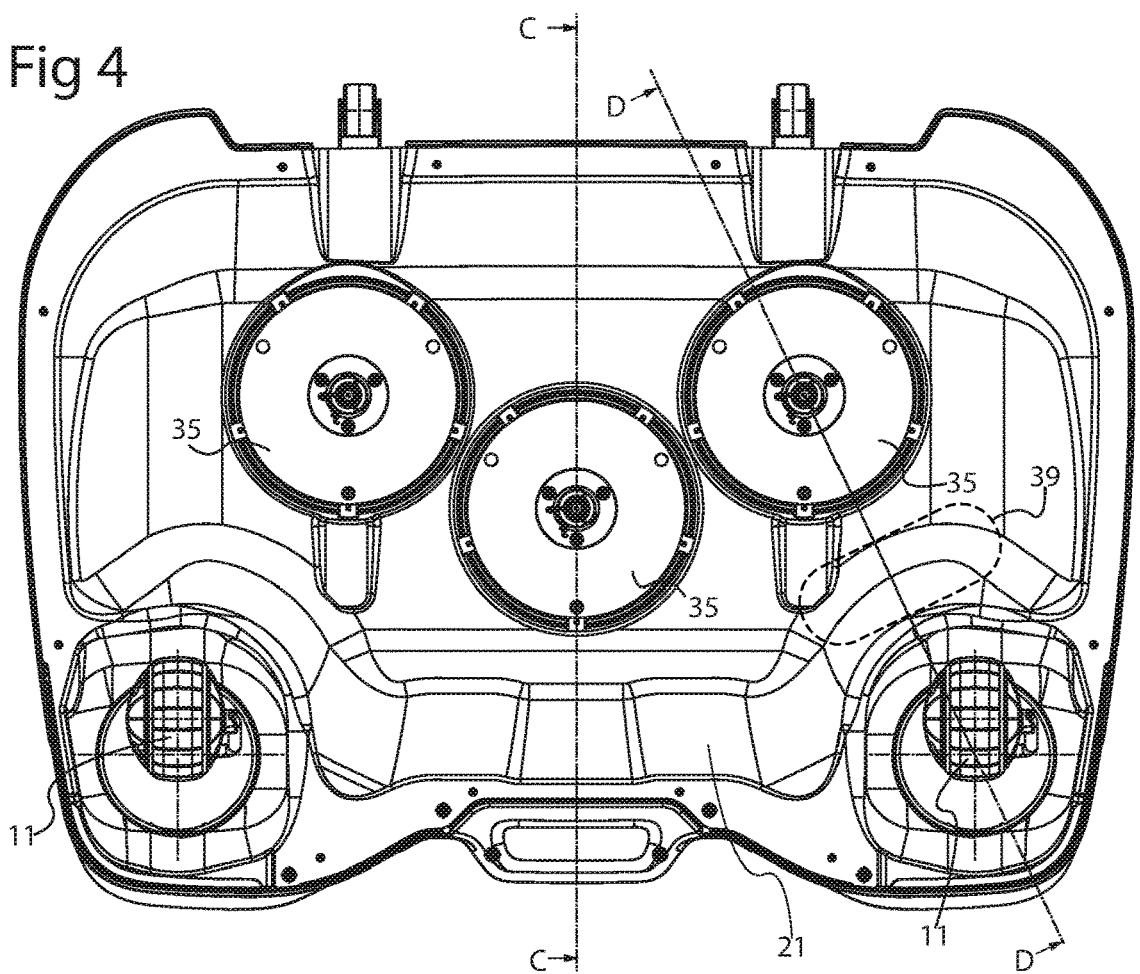
Fig 5   C-C
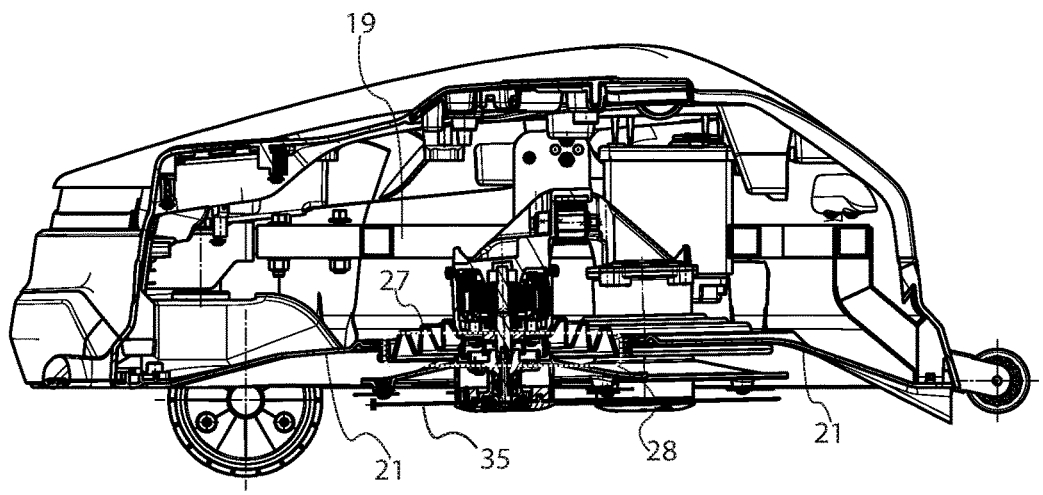

LAWN MOWER PROVIDED WITH A DIVIDER PLATE DIVIDING AN ENCLOSED SPACE INTO AN UPPER SPACE AND A CUTTING SPACE

TECHNICAL FIELD

The present disclosure relates to a lawn mower configured to process a lawn surface and comprising a chassis, at least partially carried by a set of wheels adapted to rest on the lawn surface, a cutting device suspended by the chassis, and an outer cover, enclosing the chassis and being open towards the lawn surface, thereby forming an enclosed space between the outer cover and the lawn surface

BACKGROUND

A lawnmower having such a cutting implement is disclosed for instance in WO-2014/007729-A1, where a robotic lawnmower comprises a cover forming a cutting space and having five cutting devices in the form of discs.

A general problem associated with lawnmowers of this type is how to make them more reliable, and to provide a good and uniform cutting result over a large lawn.

SUMMARY

One object of the present disclosure is therefore to provide a lawn mower that provides a more uniform cut lawn surface.

This object is achieved with a lawn mower as defined in claim 1. More particularly, in a lawn mower of the initially mentioned kind, there is provided a divider plate dividing the enclosed space into an upper space and a cutting space, the divider plate generally extending along a plane that is approximately parallel with the lawn surface. The cutting device projects through an opening in the divider plate, and edges of the divider plate are connected to the outer cover. This forms a barrier that protects the upper space, which may contain motors and the like, from cut grass thrown by the cutting devices, and as the edges of the divider plate are connected with the outer cover, the whole of the upper space may be protected. As the divider plate generally extends in parallel with the lawn surface, although it may locally deviate from this plane, the divider plate is well suited for deflecting cut grass thrown by the cutting devices, rather than collecting lumps thereof, and therefore may contribute with evenly spreading cut grass over the lawn surface.

Edges of the divider plate may be rigidly connected to the outer cover and may form a seal therebetween along the greater portion of the divider plate periphery. This prevents to a very great extent that cut grass and other debris reaches the upper space where sensitive electric and mechanical components and arrangements may be located. The edges may be connected to the outer cover by means of rivets, for instance.

The outer cover and the divider plate may be moveable with a horizontal play in relation to the chassis in at least one direction parallel with the plane of the lawn surface, which surface is defined by the wheels.

The opening may have a play in relation to the cutting device, thereby allowing the divider plate to move said predetermined distance in relation to the cutting device and the chassis. This gives some resilience and allows for instance an outer cover to function also as a collision detection device. Should the lawn mower collide with an external object, this results in a movement of the outer cover and the divider plate in relation to the chassis which movement can be detected to indicate a collision.

The present disclosure thus also relates to a lawn mower configured to process a lawn surface and comprising a chassis, at least partially carried by a set of wheels adapted to rest on the lawn surface, a cutting device suspended by the chassis, and an outer cover, enclosing the chassis and being open towards the lawn surface, thereby forming an enclosed space between the outer cover and the lawn surface, wherein a divider plate divides the enclosed space into an upper space and a cutting space, the divider plate generally extending along a plane that is approximately parallel with the lawn surface, wherein the cutting device projects through an opening in the divider plate, and wherein the divider plate is moveable with a horizontal play in relation to the chassis in at least one direction parallel with the plane of the lawn surface.

A bellows may be provided, connecting the divider plate to the cutting device, wherein the bellows is pleated in a traversal direction with regard to the plane in which the divider plate extends. This covers the area making up the horizontal play to protect the space above the divider plate, while allowing the movement of the divider plate.

Wheels, in the aforementioned set of wheels, may extend through the divider plate into a wheel space, and the divider plate may be bent out of the plane in which it generally extends to form a downward projecting ridge in between a cutting device and the wheel space. This ridge protects the wheel space from cut grass thrown by the cutting device.

The present disclosure also relates to a lawn mower configured to process a lawn surface and comprising a chassis, at least partially carried by at least one wheel adapted to rest on the lawn surface. A divider plate is provided protecting the chassis from the lawn surface, wherein a shaft connected to said wheel projects through the divider plate. A recess is provided in the divider plate, in which recess the wheel is partly located, the recess having a depth, compared to surrounding portions of the divider plate, being at least 30% of the wheel diameter. This allows a wheel with a relatively large diameter to be used, and the divider plate may still be located close to the lawn surface which enables efficient spreading of cut grass thereover. A comparatively large wheel rolls better on an uneven surface.

Still further, the present disclosure considers a lawn mower, configured to process a lawn surface and comprising a chassis, at least partially carried by at least one wheel adapted to rest on the lawn surface. A divider plate is provided, protecting the chassis from the lawn surface, wherein a shaft connected to the wheel projects through an opening in the divider plate. This opening is oversized with regard to the shaft, such that the divider plate can move in a direction of its plane in relation to the shaft. A sealing screen is attached to the shaft below the divider plate, the sealing screen being oversized with regard to the opening. This means that the sealing screen may protect the space above the divider plate from cut grass and the like, and still allow a divider plate to shaft movement.

The divider plate may typically be made from a sheet of reinforced polypropylene.

BRIEF DESCRIPTION OF THE DRAWINGS

FIG. 4 shows a front view of the bottom side of the lawn mower of FIG. 1.

FIG. 5 shows a partial cross section along the line C-C in FIG. 4.

DETAILED DESCRIPTION

The present disclosure relates generally to lawn mowers. One example of a lawn mower, functioning as a self-propelled robotic tool, is shown in WO-2014/007729-A1, which describes a lawn mower with five cutting discs.

Figure 1:
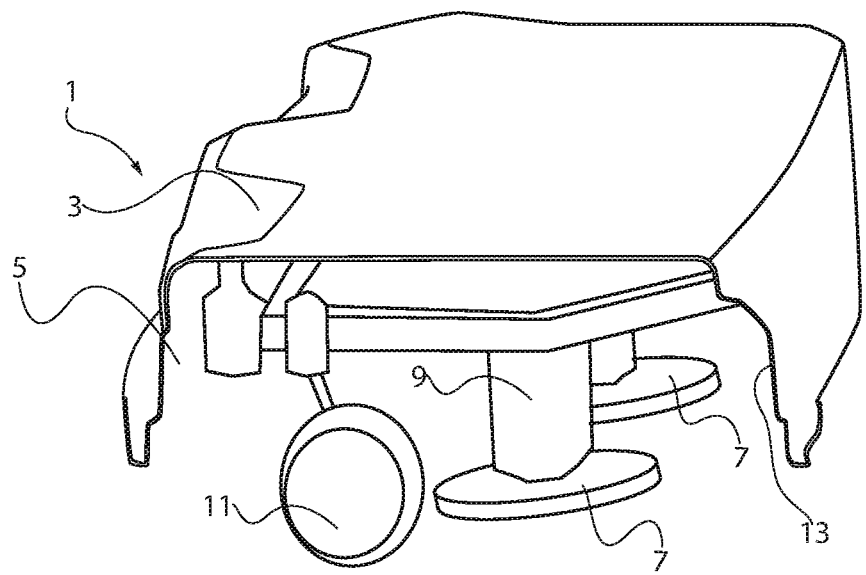
FIG. 1 illustrates a cross section of a lawn mower according to known art.

A part of such a lawn mower is illustrated in FIG. 1, where the lawn mower 1 comprises a cover 3 forming a cutting space 5 between the cover 3 and a lawn surface upon which the lawn mower runs. A cutting arrangement, in the illustrated case a number of rotating discs 7 e.g. provided with knives, has cutting edges moving in a circular pattern. A driving arrangement 9, for driving the cutting discs 7, is located in the cutting space 5 as well. The driving arrangement may include the transmission arrangement from a motor to a disc, and the motor may also be included under the cover 3.

A set of wheels 11, connected to the cover 3 e.g. via a common chassis, may roll on the lawn surface to obtain a predetermined distance between the cutting arrangement and the lawn surface.

Such lawnmowers may be very efficient, and if provided with a plurality of cutting discs they may be capable of cutting large lawn surfaces such as parks, golf courses, sport grounds, etc.

Under moist conditions, for instance, the lawnmower may leave large lumps of cut grass on the cut lawn surface rather than spreading the cut matter evenly thereover.

The present disclosure presents a structure used to eliminate or reduce this problem. It has been understood that the formation of lumps in prior art mowers as the one illustrated in FIG. 1 to a great extent is caused by the cutting arrangement hurling the grass being cut onto vertical or almost vertical surfaces 13 in the interior of the cover 3. There, the grass cuttings become stuck, eventually forming a large lump. When the lump becomes heavy enough, it falls off the surface 13 and lands on the cut lawn surface.

Figure 2:
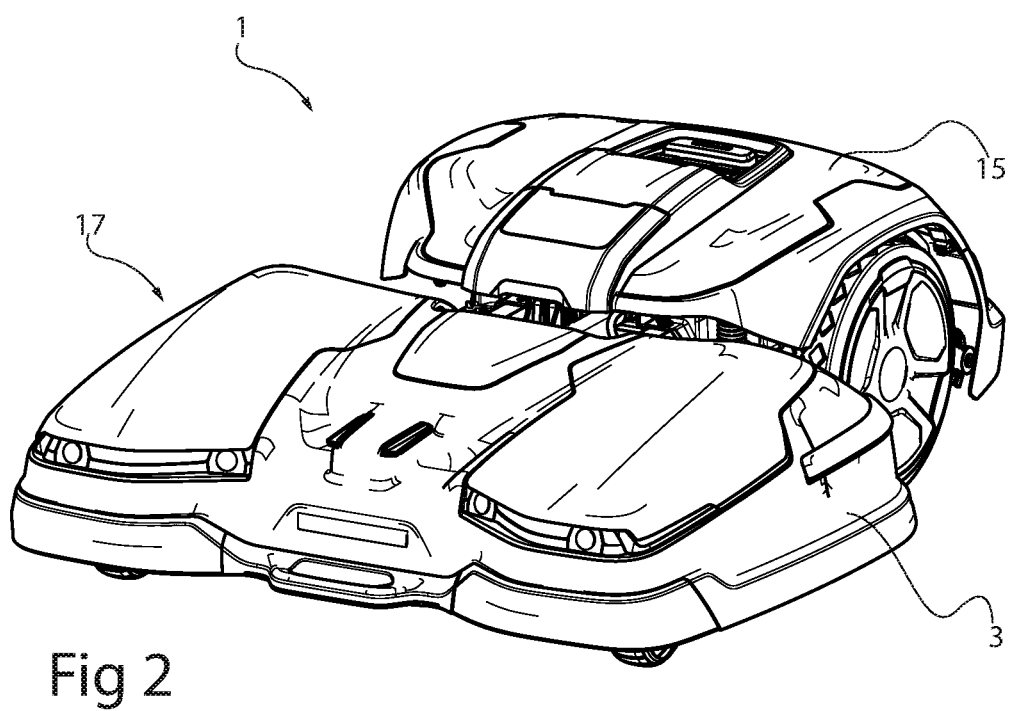
FIG. 2 shows a perspective view of a lawn mower according to an example of the present disclosure.

Solutions wholly or partly obviating this problem will be discussed in detail. First however, reference is made to FIG. 2, showing a perspective view of an example of a lawnmower where the solution may be implemented. This lawnmower 1 is a self-propelled robotic lawnmower with an articulated configuration where a rear part 15 comprises a driving arrangement and a cutting implement is made up by a front part 17 as illustrated in the drawing. Front part 17 has an outer cover 3 and may be interchangeable with other cutting implements and other working implements if desired. The cutting implement of the present disclosure could however be used also on a single-part robotic lawn mower, a lawn tractor cutting implement, or a hand-pushed lawnmower.

Figure 3:
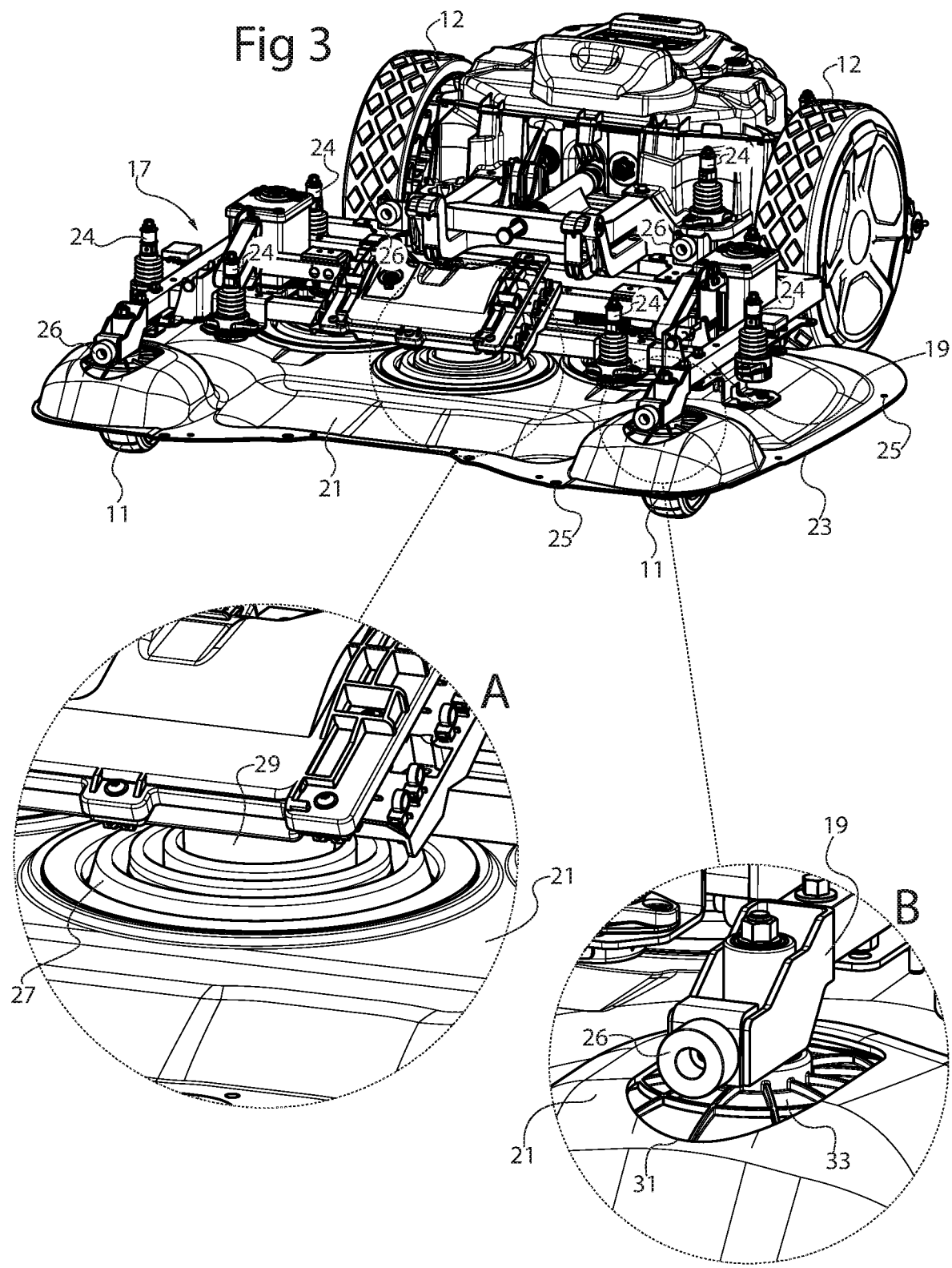
FIG. 3 shows the lawn mower of FIG. 2 with an outer cover removed and two enlarged portions A and B thereof.

FIG. 3 shows the lawn mower of FIG. 2 with the outer cover 3 removed. As illustrated, the outer cover encloses a chassis 19, which may provide several functions. The shown chassis 19 provides a connection to the rear part 15 and has two swiveling wheels 11 which together with the rear part 15 carries the front part 17. When assembled as in FIG. 2, the outer cover 3 forms an enclosed space together with a lawn surface that the lawn mower processes.

Returning to FIG. 3, a divider plate 21 is provided, which divides the enclosed space into an upper space and a cutting space. The divider plate 21 generally extends along a plane approximately parallel with the lawn surface, although it may bulge somewhat therefrom as will be discussed. The lawn surface is defined by the front 11 and rear 12 wheels. The divider plate may be a single, pressed plastic component e.g. made in reinforced polypropylene, PP, for instance, although other plastic or metal materials are conceivable.

The divider plate 21 generally comprises few or no surfaces that are vertical or close to vertical with regard to the lawn surface and that are exposed to a flow of cut grass from the cutting devices of the lawn mower. Therefore, thanks to the divider plate 21 the buildup of large lumps of cut grass can generally be avoided. At the same time, the chassis as well as the motors driving the cutting devices may be protected from a flow cut grass which could otherwise impair their function during long-term use. To improve this function, the edges 23 of the divider plate may reach out to the outer cover 3 (cf. FIG. 2) to form a seal therebetween. This may be the case along the whole or along the greater portion of the divider plate 21 periphery. The edges 23 of the divider plate 21 may be rigidly connected to the outer cover.

It is possible to connect edges of the divider plate to the outer cover by means of rivets. Holes 25 for rivets in the divider plate 21 are shown in FIG. 3.

The cutting devices projects into the cutting space through openings in the divider plate 21.

It is advantageous to let the outer cover 3 move to some extent in relation to the chassis 19. This makes the lawnmower somewhat resilient if it collides with fixed object, for instance. Further, it becomes possible to detect a collision mechanically by means of a sensor that detect a movement of the outer cover in relation to the chassis 19. In the example of FIG. 3, the outer cover is connected to the chassis 19 by means of a plurality of e.g. joystick-like levers 24 which allow the outer cover to move resiliently in relation to the chassis 19 and at the same time may provide sensor signals describing this movement. Limiting stops 26 may be provided to the chassis to limit the amount of movement allowed for the outer cover in relation to the chassis by abutting the outer cover 3 at a maximum allowed movement. Cutting devices and wheel arrangements extending through the divider plate 21 could preferably extend through oversized openings in the divider plate 21, thereby providing a play.

In the enlarged portion A of FIG. 3 there is shown the connection between a cutting device and its motor where it extends through the divider plate 21. The motor is fixedly connected to the chassis 19. In order to allow the divider plate 21 to move to a certain extent in directions more or less parallel with the divider plate's 21 general plane, the opening in the divider plate 21 is oversized as compared with the shaft 29 connecting the cutting device with its motor to provide a lateral play. A bellows 27 connects the shaft 29 with the divider plate 21 and allows a relative movement therebetween while avoiding letting cut grass into the upper space. As will be shown, the lawnmower of FIG. 3 has three cutting devices although two of those are mostly obscured by the chassis 19 in FIG. 3. A greater or smaller number of cutting devices is of course conceivable.

In the enlarged portion B of FIG. 3 there is shown the connection, through the divider plate 21, between the chassis 19 and one of the swiveling wheels 11. Here as well an oversized opening 31 in the divider plate 21 is provided. Although it would be possible to use a bellows at this location as well, a simpler alternative is used as this location is less exposed to cut grass from the cutting devices. Thus, a sealing screen 33 is attached to the shaft connecting the chassis 19 to the wheel 11 to provide a play in the horizontal direction. The sealing screen 33 is larger than the opening 31 in the divider plate 21 and located under the same. The sealing screen 33 therefore prevents cut grass and other items from entering the upper space.

FIG. 4 shows a bottom view of the lawn mower front part in FIG. 2. As illustrated, the lawn mower has three cutting devices in the form of cutting discs 35. Those discs cover most of the lawn mower width in between the wheels 11.

FIG. 5 shows the cross section along the line C-C in FIG. 4. As shown, the divider plate 21 is not entirely flat although it generally extends in a plane parallel with the lawn surface as determined by the front and rear wheels of the lawn mower. Instead, the divider plate 21 may be somewhat concave to leave room for the cutting disc 35. Towards the front and the rear of the divider plate 21 its distance to the lawn surface decreases gradually while substantially avoiding vertical surfaces. The divider plate 21 serves to deflect cut grass evenly over the lawn surface.

FIG. 5 also shows the shaft of the cutting device 35 projecting through the opening 28 in the divider plate 21, indicated with a dotted line. The opening 28 is oversized with regard to this shaft and is covered by a flexible bellows 27, connected to the shaft and to the divider plate 21. The bellows 27 is typically made in a rubber material.

Figure 6:
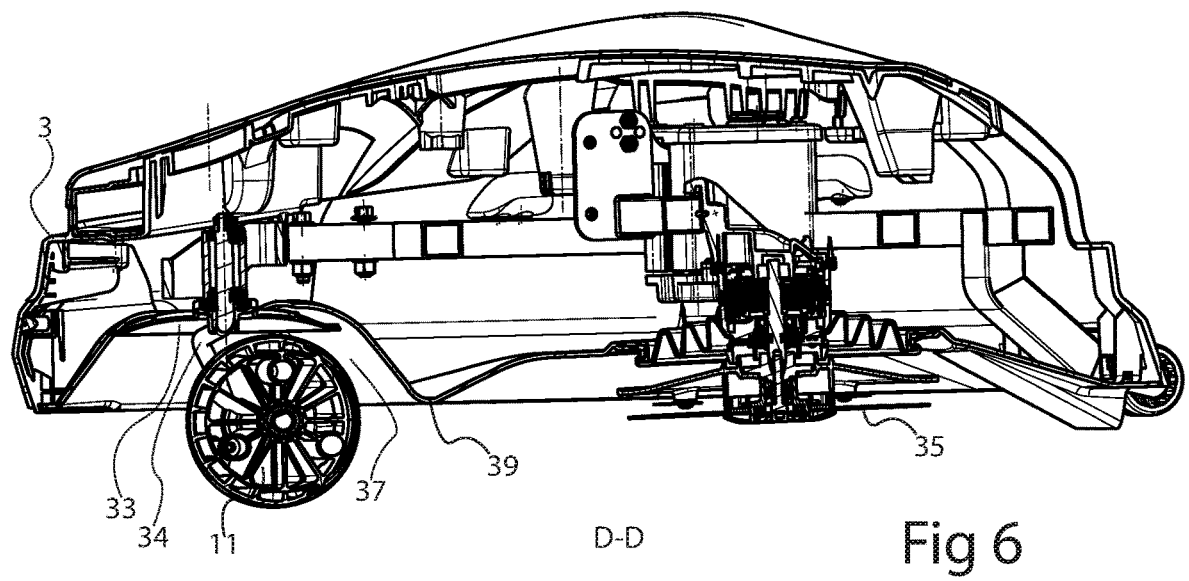
FIG. 6 shows a partial cross section along the line D-D in FIG. 4.

FIG. 6 shows a cross section along the line D-D in FIG. 4, passing through a cutting device 35 and a swiveling wheel 11. The wheel 11 may be located in an upwards projecting recess 37 forming a wheel space in the divider plate 21 to allow the use of a big enough wheel 11 to make the lawnmower move well on a rough lawn surface. The depth of the recess may typically be at least 30% of the wheel diameter.

In order to avoid buildup of lumps of cut grass in the recess 37, a ridge 39 may formed in the divider plate 21 in between the recess 37 and the cutting device 35, as is also indicated in FIG. 4.

The ridge 39 protrudes downwards towards the lawn surface and serves to deflect cut grass thrown by the cutting disc 35 such that it does not enter the recess 37 to any greater extent.

Thanks to this arrangement, and to the sealing screen 33 covering the opening in the divider plate 21 entry of cut grass in the upper space, above the divider plate 21, can be avoided.

Figure 7:
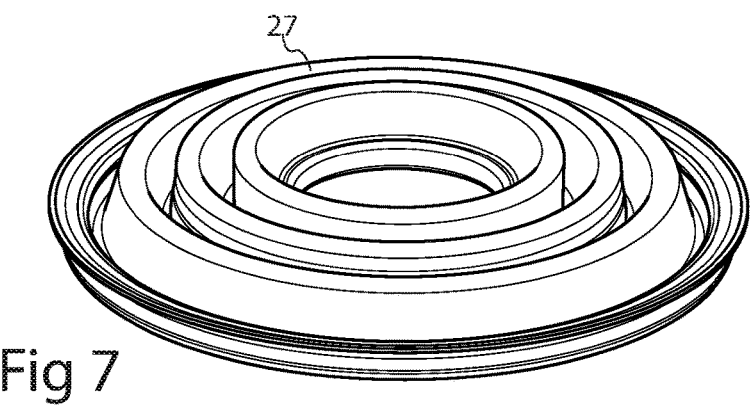
FIG. 7 shows a bellows for sealing between a cutting device shaft and a divider plate.

FIG. 7 shows a bellows 27 for sealing between a cutting device shaft and a divider plate. As shown, the bellows may be pleated in a traversal direction with regard to the overall plane in which the divider plate 21 extends. This enhances the bellow's 27 flexibility in the direction of this plane.

The present disclosure is not limited to the above-described examples and may be varied and altered in different ways within the scope of the appended claims.

The invention claimed is:

1. A lawn mower configured to process a lawn surface and comprising:
    a chassis, at least partially carried by a set of wheels adapted to rest on the lawn surface,
    a cutting device suspended by the chassis, and
    an outer cover, enclosing the chassis and being open towards the lawn surface, thereby forming an enclosed space between the outer cover and the lawn surface, wherein a divider plate divides the enclosed space into an upper space and a cutting space, the divider plate generally extending along a plane that is approximately parallel with the lawn surface, wherein
    the cutting device projects through an opening in the divider plate, and
    edges of the divider plate are connected to the outer cover.

2. The lawn mower according to claim 1, wherein the edges of the divider plate are rigidly connected to the outer cover.

3. The lawn mower according to claim 1, wherein the edges of the divider plate reach out to the outer cover to form a seal therebetween along the greater portion of the divider plate periphery.

4. The lawn mower according to claim 1, wherein the edges of the divider plate are connected to the outer cover by rivets.

5. The lawn mower according to claim 1, wherein the outer cover and the divider plate are moveable with a horizontal play in relation to the chassis in at least one direction parallel with the plane of the lawn surface.

6. The lawn mower according to claim 5, wherein said opening has a play in relation to the cutting device thereby allowing the divider plate to move a predetermined distance in relation to the cutting device and the chassis.

7. A lawn mower configured to process a lawn surface and comprising:
    a chassis, at least partially carried by a set of wheels adapted to rest on the lawn surface,
    a cutting device suspended by the chassis, and
    an outer cover, enclosing the chassis and being open towards the lawn surface, thereby forming an enclosed space between the outer cover and the lawn surface, wherein a divider plate divides the enclosed space into an upper space and a cutting space, the divider plate generally extending along a plane that is approximately parallel with the lawn surface, wherein
    the cutting device projects through an opening the divider plate, and
    wherein the divider plate is moveable with a horizontal play in relation to the chassis in at least one direction parallel with the plane of the lawn surface.

8. The lawn mower according to claim 7, comprising a bellows connecting the divider plate to the cutting device, wherein the bellows is pleated in a traversal direction with regard to the plane in which the divider plate extends.

9. The lawn mower according to claim 7, wherein further wheels, in said set of wheels, extend through the divider plate into a wheel space, and the divider plate is bent out of the plane in which the divider plate generally extends to form a downward projecting ridge in between the cutting device and the wheel space.

10. The lawn mower according to claim 7, wherein the divider plate is made from a sheet of reinforced polypropylene.

11. A lawn mower configured to process a lawn surface and comprising a chassis, at least partially carried by at least one wheel adapted to rest on the lawn surface, the lawn mower comprising a divider plate protecting the chassis from the lawn surface, wherein a shaft connected to said wheel projects through the divider plate, and a recess in the divider plate is provided where the at least one wheel is partly located and which has a depth being at least 30% of a wheel diameter of the at least one wheel.

12. The lawn mower of claim 11, wherein the shaft projects through an opening in the divider plate, and wherein the opening is oversized with regard to the shaft, and a sealing screen is attached to the shaft below the divider plate, the sealing screen being oversized with regard to the opening.

* * * * *